United States Patent [19]

Anthony et al.

[11] Patent Number: 4,462,430

[45] Date of Patent: Jul. 31, 1984

[54] PIPE PLUGGING DEVICE

[76] Inventors: Leonard R. Anthony, 4680 S. Acoma, Englewood, Colo. 80110; Ted N. Anthony, 5523 S. Datura, Littleton, Colo. 80120

[21] Appl. No.: 419,798

[22] Filed: Sep. 20, 1982

[51] Int. Cl.³ .............................................. F16L 55/10
[52] U.S. Cl. .................................. 138/89; 15/104.16
[58] Field of Search .................................. 138/89, 91; 15/104.06 R, 104.16, 104.3 R

[56] References Cited

U.S. PATENT DOCUMENTS

| | | | |
|---|---|---|---|
| 470,669 | 3/1892 | Fitzpatrick . | |
| 730,378 | 6/1903 | Lambert . | |
| 798,031 | 8/1905 | Herky | 138/91 |
| 884,262 | 4/1908 | Brunner . | |
| 939,804 | 11/1909 | Christy . | |
| 1,788,895 | 1/1931 | Reynolds . | |
| 1,966,819 | 7/1934 | Irvin | 137/78 |
| 2,107,259 | 2/1938 | Hazel | 138/89 |
| 2,256,775 | 9/1941 | Hubbell | 138/89 |
| 2,870,794 | 1/1959 | Thaxton | 138/89 |
| 3,338,499 | 8/1967 | Gilbert | 228/57 |
| 3,467,271 | 9/1969 | Kaiser et al. | 220/24.5 |
| 3,704,729 | 12/1972 | Tomlinson | 138/90 |
| 3,763,896 | 10/1973 | Horne et al. | 138/89 |
| 4,077,435 | 3/1978 | Van Scoy | 138/89 X |
| 4,303,101 | 12/1981 | Tholon | 138/89 |

FOREIGN PATENT DOCUMENTS

| | | | |
|---|---|---|---|
| 3768 | of 1887 | United Kingdom | 138/91 |
| 198535 | 12/1922 | United Kingdom | 138/91 |

*Primary Examiner*—James E. Bryant, III
*Attorney, Agent, or Firm*—John E. Reilly

[57] ABSTRACT

A plugging device for machining operations having a pair of flexible, concavo-convex disks coaxially mounted in spaced relation on a central support mandrel and seated in circumferential grooves thereon, the convex side of each disk normally facing the mandrel's leading end. The mandrel is adapted for interfitting engagement at its opposite end by an insertion tool having releasable locking jaws. The diameter of the disks is slightly greater than the inner diameter of the pipe and is deformable for insertion to a desired point in the pipe, the arcs of the disk then being reversed to seal the disk edges against the inner pipe walls. When removing from the pipe, the arcs are reversed as they are withdrawn from the pipe, allowing withdrawal of the plug with the disks catching and removing coolant and metal waste during withdrawal.

15 Claims, 5 Drawing Figures

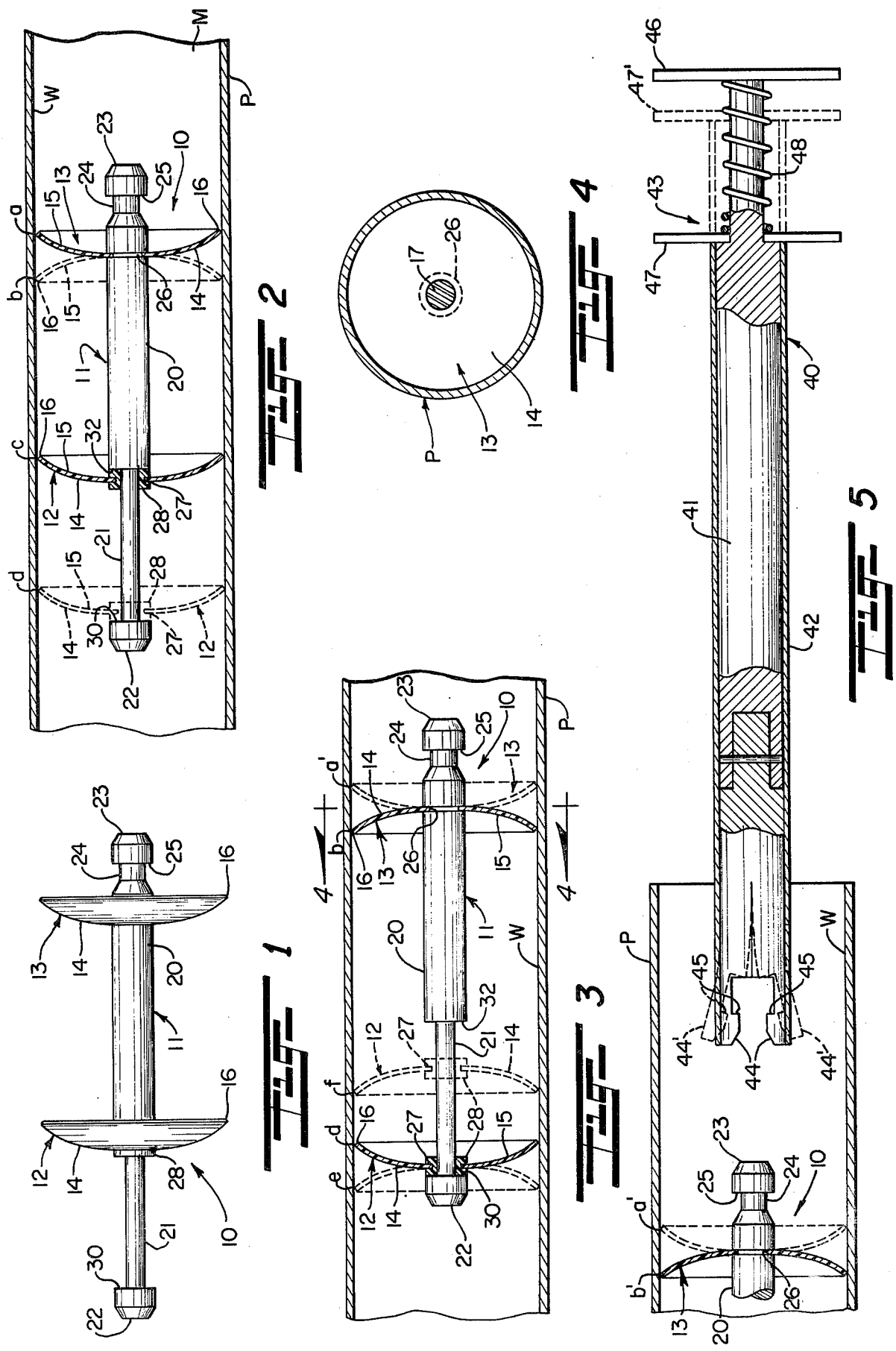

PIPE PLUGGING DEVICE

This invention relates to plugging devices for pipes, tubing sections and the like; and more particularly relates to a novel and improved plug for temporarily stopping a pipe or tubing section in preparation for machining operations therein.

Background and Field of Invention

Machining operations performed within a tube or pipe, such as, threading or forming counterbores produce a substantial accumulation of frictional heat on both the pipe surface and the machining tool. To counteract this effect, it is necessary to circulate a fluid lubricant or coolant within the pipe bore which, along with cuttings produced from the machining operation, will tend to build up in front of the machining tool. Thus, it is customary practice to expel the coolant and cuttings with compressed air or by advancing a plug through the pipe. These methods are unsatisfactory and uneconomical for several reasons: Traces of coolant are often left in the pipe; it is difficult to efficiently collect coolant for filtering and use in subsequent operations; and machining waste products, such as, metal filings and chips may be left throughout the length of the pipe. In view of these problems, it is desirable to temporarily seal the pipe beyond the machining area with a plug device which will facilitate efficient and complete removal of accumulated coolant and waste after the operation has been completed.

Various devices for temporarily stopping pipe sections have been heretofore proposed, typically comprising circular or disk-shaped plug members that are deformable to some degree to seal the pipe bore. For example, U.S. Pat. No. 2,256,775 to Hubbell teaches a pipe plug wherein flexible sealing disks and radially extending spring-loaded arms are mounted on a central mandrel; the disks serve to seal the pipe against fluid flow while the arms are required to grip the pipe walls, holding the device in position within the bore. U.S. Pat. No. 3,704,729 to Tomlinson discloses a plugging tool having a radially expansible rubber sleeve disposed on an axial tube; by activating a screw jack mechanism, the sleeve may be made to expand into sealing contact with the surrounding pipe. Yet another approach is the subject of U.S. Pat. No. 939,804 to Christy, wherein a plug for sewer traps comprises a flexible bell portion, washer, and packing ring which are inserted one at a time along a central shaft into a pipe. At the desired plugging point, the shaft is retracted thus pulling the components into close-fitting relation and wedging the whole arrangement against the pipe walls.

For the most part, devices of the type described have been designed to block the normal flow of water or other fluid through a section of pipeline so that repairs may be made. Accordingly, plugs of this type are quite complex in construction, often including a number of moving parts as well as means for reinforcing the structure and bracing the arrangement within the pipe. For this reason, such devices are not suitable for use in connection with pipe machining activities, since metal waste from the operation and the viscosity of the coolant itself may interfere with the function of the moving parts, such as, springs, bearings and joints. Moreover, prior art plugs and seals are for various reasons not readily adaptable for use both as a plug and as a tool for removing accumulated waste and lubricant left within the pipe after machining. For example, the Hubbell plug is capable of free movement in only a downstream direction, and may not be withdrawn through its site of insertion. In the Tomlinson plug, it is necessary to collapse the expanded rubber sleeve prior to removal from the pipe, allowing coolant to leak past the plug and into the pipe. Accordingly, a single device capable of plugging the pipe during machining and repair followed by effectively removing the cuttings and coolant would be most desirable and useful in many applications.

Summary of the Invention

It is therefore an object of the present invention to provide for a novel and improved plugging device which is particularly well-suited for use in connection with pipe machining activities, such as, threading or counterboring.

It is another object of the present invention to provide for a novel and improved plugging device which is insertable into a pipe bore to a point just beyond the area to be machined, and is adapted to sealingly engage the inner pipe wall so as to prevent the leakage of coolant or lubricant away from the desired machining area.

A further object of the present invention is to provide a pipe plug which may further be employed as an instrument for removing coolant and waste materials from the pipe bore following machining operations.

Another object of the present invention is to provide for a novel and improved pipe plugging device that is simple yet extremely durable in construction, as well as relatively inexpensive to manufacture.

Yet another object of the present invention is to provide a pipe plug for use in machining operations having means for recovering coolant or lubricant used therewith, so that the coolant may be filtered and used in subsequent operations.

In accordance with the present invention, there has been devised a novel and improved plugging device comprised of a central support member and flexible sealing members in the form of a pair of flexible disks mounted in coaxial spaced relation thereon. The disks are seated in circumferential grooves on the mandrel such that the convex side of each disk normally faces the leading end of the mandrel. At its opposite end, the mandrel is adapted for interfitting engagement by a suitable insertion tool, such as, one employing releasable locking jaws or fingers.

The plugging device is particularly advantageous in machining operations wherein the disks are given a diameter slightly greater than the inner diameter of the pipe to be plugged and machined, but are sufficiently deformable so as to permit insertion through the pipe to a desired point. When positioned at a point past the machining area, the arcs of the disk may be reversed to seal the disk edges against the inner pipe walls. To effect their removal, the disk arcs are reversed as they are withdrawn from the pipe by an extraction tool, the disks then acting to effectively catch and remove both coolant and metal waste.

In a preferred embodiment, the first or leading disk is mounted on a ring which is adapted to slide over a limited portion of the mandrel adjacent to the leading end. This arrangement permits reversal of the disk arcs one at a time so that they can be faced in opposite directions for more effective positioning in the pipe as well as for sealing and removal of coolant.

The above and other objects, advantages and features of the present invention will become more readily understood and appreciated from a consideration of the following detailed description of a preferred embodiment when taken together with the accompanying drawings in which:

BRIEF DESCRIPTION OF THE DRAWINGS

FIG. 1 is a side view in elevation of a preferred form of plugging device in accordance with the present invention;

FIG. 2 is a view partially in section view of the plugging device of FIG. 1 shown upon insertion into a pipe with movement of disks and arc reversal shown in phantom;

FIG. 3 is a view partially in section illustrating the plugging device of FIG. 1 as it is positioned within the pipe prior to machining, further disk movement and arc reversal being shown in phantom;

FIG. 4 is a cross-sectional view taken along lines 4—4 of FIG. 3; and

FIG. 5 is a view partially in section of a portion of the plugging device in combination with an insertion and extraction tool employed in positioning and retracting the plugging device relative to a pipe.

DETAILED DESCRIPTION OF THE PREFERRED EMBODIMENT

Referring in detail to the drawings, and in particular to FIGS. 1 and 2, a preferred form of plugging device 10 comprises an arbor or mandrel 11 of elongated cylindrical configuration provided with a leading disk member 12 and a trailing disk member 13 mounted in coaxial spaced relation to one another at opposite ends of the mandrel 11. Mandrel 11 includes a main body 20 of a first diameter, an axial extension 21 of the body 20 of a second reduced diameter terminating in an enlarged nose 22 at the leading end of the mandrel. The trailing end of the body 20 opposite to the reduced extension 21 includes a nose 23 separated from the main body 20 by an external groove 24 so as to form a shoulder 25 behind the nose 23. Preferably, the nose end portions 22 and 23 are given a diameter corresponding to that of the body 20.

The disks 12 and 13 are formed out of a relatively thin, flexible material, preferably plastic, and are of a diameter slightly larger than the inner diameter of the pipe to be plugged. Disks 12, 13 are identical in construction and each includes a normally convex surface 14 and a normally concave surface 15 joined by a common outer circumferential edge 16. Hence, disks 12, 13 are ordinarily flexed so that convex sides 14 are directed toward leading end 21 of mandrel 11. Furthermore, as shown in cross-section the disk 13 is provided with a central mandrel-receiving aperture by which the disk is snapped or inserted into an annular groove 26 formed on the mandrel body 20, the diameter of aperture substantially corresponding to the reduced diameter defined by the annular groove 26. The disk 12 has a central aperture by which the disk 12 is inserted in a circumferential groove 27 on a ring member 28 which is adapted for sliding movement on reduced extension 21 of the mandrel 11. The external diameter of ring member 28 is preferably equal to that of main mandrel body 20, while the inner diameter must be of such dimension as to allow ring member 28 and leading disk 12 thereon to slide on the reduced extension 21.

The mandrel 11 is provided at its leading nose end 22 with a first shoulder 30 of a diameter greater than that of reduced portion 21 so as to arrest the sliding movement of the leading disk 12 and retain it on reduced extension 21. A second shoulder 32 at the opposite end of reduced extension 21 serves to limit movement of the disk 12 toward the body 20. Trailing end 23 of the mandrel 11 is adapted to be engaged by an insertion/extraction tool 40 in a manner hereinafter described in more detail.

The insertion/extraction tool 40 may be of any appropriate construction adapted to securely but releasably engage the trailing nose end 23 of the mandrel 11. A preferred form of tool is illustrated in cross-section in FIG. 5 and comprises an inner body member 41 slidable through an outer concentric sleeve 42, and a gripping portion 43. The inner body member 41 includes a pair of mandrel-receiving jaw members 44 at its leading end which are biased in normally sprung-apart relation, as shown in phantom and indicated at 44'. Jaws 44 are notched to provide internal shoulders 45 so that when urged to the closed position are engageable with the shoulder 25 of the nose 23. In use, the front handle 47 is grasped in one hand and the other, spring-loaded front handle 47 is retracted to the position 47' against the urging of spring 48, thereby advancing the inner body member 41 through outer sleeve 42. As a result, jaws 44 are released to the open position 44' after clearing the end of the sleeve 42 and are aligned with the shoulder 27 on the nose 23. In order to effect closure, the sleeve 42 is permitted to advance over the jaws 44 so that the jaws 44 are contracted into the closed position within outer sleeve 42, thereby engaging mandrel nose end 23 therebetween. The handles 46 and 47 are then grasped for convenient insertion of the entire plug 10 into a pipe or removal therefrom.

The novel and advantageous features of the invention are best understood through a consideration of its use in temporarily stopping a pipe prior to machining. Referring first to FIG. 2, plugging device 10 is inserted into a pipe P, in the direction indicated from right to left in FIG. 2. It will be noted that disks 12, 13 are normally arced or flexed, each having convex side 14 directed toward the leading end 22 of the mandrel 11 as indicated by positions "a" and "c", as shown in full in FIG. 2. The insertion/extraction tool 40, not shown in FIG. 2, is secured to the trailing end 23 of mandrel 11 in the manner heretofore described, and inserted into mouth M of pipe P when forward pressure is applied to the tool 40. In order to permit passage of the mandrel into the pipe, disks 12, 13 are forced to bend or deform and their circumferential edges 16 tightly contact inner walls W of the pipe P. The mandrel 11 is then advanced through the pipe P until trailing end 23 clears or passes the pipe area that is to be machined. The tool 40 is then drawn back in an opposite, rearward direction toward the mouth M, as if to withdraw the device therefrom. This motion effects a reversal of the arc of trailing disk 13 from the position denoted "a" to position "b" shown in phantom, the normally convex side of disk 13 becoming concave, and the previously concave side 15 reversed to a convex configuration. Now with reference to both FIGS. 2 and 3, constant pull is applied to the mandrel so that the leading disk 12 slides on ring member 26 from position "c" to position "d" abutting the shoulder at the nose end 22 of extension 23 and, with continued pulling, reverses its arc from position "d" to "e" in FIG. 3. As a final step preliminary to machining, pushing force is once again applied until trailing disk 13 reverses to its original, normally arced attitude, as indicated at "a'" in FIG. 3; at the same time leading disk 12 slides on ring member 28 to a point on reduced portion 21 between first shoulder 30 and second shoulder 32. At this time, disks 12, 13 are in respective positions "f" and "a'", and insertion/extraction tool 40 may be released and withdrawn from the pipe, leaving plugging device 10 properly positioned therewithin. Coolant or lubricating fluid may then be added in preparation for the machining procedure.

During the operation, coolant is circulated within the pipe section, but is confined or sealed by plugging device 10 to within the general area being worked. Furthermore, the device prevents metal shavings or chips from escaping past the plugging device along the length of the pipe. It will be seen that the respective positions and arc orientations of disks 12, 13 are particularly significant in determining the utility and advantageous novelty of the invention. For example, coolant fluid and chips are pushed with considerable force against trailing disk 13 by the action of the machining tool. In response to pressure on concave side 15, the sealing engagement between disk edge 16 and pipe wall W is intensified to effectively block passage of fluid; at the same time, the resistance provided by the reverse arc of leading disk 12 at position "f" further protects against slippage of the device 10 through the pipe P. An additional advantage resides in the concavity of side 15 of disk 13 at a'. As coolant and chips are forced up against the disk 13, the curvature thereof encourages reverse flow of the mixture back toward the machining area.

The invention has still further utility in cleaning accumulated coolant and metal waste from the pipe after completion of operations. Removal of plugging device 10 is effected by reattaching insertion/extraction tool 40 to trailing end 22 of mandrel 11 and pulling outwardly, thereby causing trailing disk 13 to return to the position designated at "b", as shown in FIG. 5, and leading disk 12 to slide to position "e". With both disks 12, 13 in the "reverse-arc" attitude, pull is continued so that plug 10 is drawn toward mouth M of the pipe P. The tight contact between circumferential disk edges 16 and the walls W creates a sweeping or wiping effect within the pipe bore; the now-convex sides 15 of disks 12, 13 act to push coolant and waste out of the pipe where the fluid may be collected and filtered for later use.

From the foregoing, by damming of the bore of a pipe or tubing section at the machine end, it is possible to prevent coolant waste and contamination during the machining operation. Preferably, the disks are composed of a flexible plastic material, such as, a polyethylene which will possess the necessary flexibility and resiliency in use so as to be capable of withstanding the treating arcing or flexing in the manner described. The mandrel can be made of various ferrous or non-ferrous metals, plastics or wood if desired. The assembly can cover any range of pipe or tubes with the disk being made to be slightly oversized with respect to the bore of the tube or pipe and, for instance, the effective diameter of the disk is made to be on the order of diameter times 1.04. Similarly, each disk should be given an arc that will permit it to be reversed as described for insertion and efficient retraction or removal from the bore of the pipe while effectively sealing the pipe as described. Typically, the arc can be determined for a given diameter or size of pipe by dividing the diameter of the disk by a factor of 1.25 to determine the radius of curvature of the arc. Thus, for a disk having a diameter of 5", the radius of curvature would be 4" (based on dividing the 5" diameter by 1.25). In this relation, the curvature of the disk will cause a natural reverse flow of coolant and chips; and, as illustrated in FIG. 3, the pressure of the coolant and chips will tend to force the disk more tightly against the wall of the pipe so as not to be able to move past the disks.

It is therefore to be understood that various modifications and changes may be made in the apparatus of the present invention as well as its intended application and use without departing from the spirit and scope of the present invention as defined by the appended claims.

I claim:

1. A releasable plugging device adaptable for releasable insertion into the interior of a tubular member comprising:
    an elongated rigid central support member; and
    a pair of flexible sealing means in the form of disks, having generally concavo-convex surfaces mounted in coaxial spaced relation to one another on said support member, at least one of said sealing means being slidable in an axial direction with respect to said central support member toward and away from the the other of said sealing means, said central support member defined by an elongated cylindrical member having a main body portion provided with a disk-receiving groove therein and a reduced distal extension of said main body portion receiving the other of said disks and terminating in a limit stop member at one end opposite to said main body portion, each said sealing means terminating in an outer circumferential edge having an effective diameter greater than that of the internal diameter of said tubular member whereby to move into close-fitting sealed engagement with the internal wall surface of said tubular member solely by insertion of said central member lengthwise into said tubular member, each of said sealing means operative to undergo reversal of its concave and convex surfaces into convex and concave surfaces, respectively, in response to sliding movement through said tubular member in the direction that each said concave surface is facing.

2. A releasable plugging device according to claim 1, each of said disks being composed of a plastic material having an inner, centrally located aperture sized such that one said disk is movable into snap-fitting engagement in said disk-receiving groove on the main body of said central support member, and the other said disk is slidably mounted on said reduced distal extension.

3. A releasable plugging device according to claim 1, said central support member having gripping means at least at one end thereof.

4. A releasable plugging device according to claim 2, said central aperture of said other disk including means for slidably mounting said other disk on said reduced axial extension.

5. A releasable plugging device insertable into the interior of a pipe section comprising:
    a mandrel having an elongated cylindrical body of a first diameter and an axial extension of a second reduced diameter with respect to said first diameter;
    a pair of thin flexible disks of concavo-convex configuration terminating in outer circumferential edges of an effective diameter greater than the diameter of the inner wall surface of the pipe section to be plugged, one of said disks being mounted on said main cylindrical body and the other of said disks being slidably mounted on said axial extension, and an enlarged end portion on said axial extension to limit sliding movement of the other of said disks away from said main cylindrical body.

6. A releasable plugging device according to claim 5, said axial extension having gripping means formed on said enlarged end portion.

7. A releasable plugging device according to claim 6, said gripping means including a shoulder portion at the base thereof adjacent said axial extension.

8. A releasable plugging device according to claim 7, said enlarged end portion having a diameter substantially equal to the diameter of said cylindrical body.

9. A releasable plugging device according to claim 5, said cylindrical body having second gripping means formed at one end thereof.

10. A releasable plugging device according to claim 9, said second gripping means comprising an external circumferential groove spaced from said free end and forming a second enlarged end portion of a diameter substantially equal to the diameter of said cylindrical body, said second end portion further provided with a shoulder portion at the base thereof.

11. A releasable plugging device according to claim 5, said one disk having an inner, centrally located aperture sized for close-fitting engagement in a circumferential recess on said cylindrical body.

12. A releasable plugging device according to claim 5, said axial extension having a ring member coaxially mounted thereon and sized so as to be slidable therealong.

13. A releasable plugging device according to claim 12, said other of said disks having an inner, centrally located aperture for mounting said disk on said ring member.

14. A releasable plugging device according to claim 5, said flexible disks being composed of a flexible plastic material.

15. A method of releasably plugging the interior of a pipe section comprising the steps of:
　inserting a releasable plugging device lengthwise into said pipe section, said releasable plugging device comprising:
　　(a) an elongated cylindrical central support member;
　　(b) a pair of flexible sealing means, each sealing means defined by a pair of thin, flexible disks with each disk having a concavo-convex surface, said disks mounted in coaxially spaced relation to one another on said central support member terminating in an outer circumferential edge having an effective diameter greater than that of the internal diameter of said pipe section so as to be movable into sealed engagement with the inner wall surface of said pipe section when said releasable plugging device is fully inserted lengthwise into said pipe section;
　　(c) said central support member including means for slidably mounting one of said sealing means for independent axial sliding movement on said central support member with respect to the other of said disks; and
　　(d) limit stop means for limiting slidable movement of said one sealing means, each of said disks being flexible in opposite axial directions such that their concave surfaces alternately will face in the same or opposite directions to one another in response to lengthwise movement of said support member through said pipe section;
　initially advancing said releasable plugging device lengthwise into said pipe section until said plugging device is fully inserted into said pipe section and the concave surfaces of said disks face in the same direction but opposite to the direction of initial advancement into said pipe section;
　moving said releasable plugging device in the direction of withdrawal from said pipe section until said disk of said other sealing means is reversed to cause its concave surface to face the concave surface on the disk of said one sealing means as said disk of said one sealing means slides away from said disk of said other sealing means;
　continuing to move said releasable plugging device in the direction of withdrawal until the disk of said one sealing means reaches its limit of slidable movement and is reversed to cause its concave surface to face in the same direction as the disk of said other sealing means; and
　followed by once again advancing said releasable plugging device in the direction of insertion to cause the disk of said other sealing means to reverse its concave surface to face away from the direction of advancement as the disk of said one sealing means slides toward the disk of said other sealing means with its concave surface remaining in a direction facing away from said concave surface on the disk of said other sealing means.

* * * * *